US 11,363,580 B2

(12) United States Patent
Pajukoski et al.

(10) Patent No.: US 11,363,580 B2
(45) Date of Patent: Jun. 14, 2022

(54) ON THE USAGE OF CONTROL RESOURCES FOR DATA TRANSMISSION

(71) Applicant: Nokia Technologies Oy, Espoo (FI)

(72) Inventors: Kari P. Pajukoski, Oulu (FI); Esa T. Tiirola, Kempele (FI); Sami-Jukka Hakola, Kempele (FI); Eeva Lahetkangas, Kiiminki (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 118 days.

(21) Appl. No.: 16/319,533

(22) PCT Filed: Aug. 1, 2017

(86) PCT No.: PCT/IB2017/054707
§ 371 (c)(1),
(2) Date: Jan. 22, 2019

(87) PCT Pub. No.: WO2018/025185
PCT Pub. Date: Feb. 8, 2018

(65) Prior Publication Data
US 2019/0200333 A1 Jun. 27, 2019

Related U.S. Application Data

(60) Provisional application No. 62/369,241, filed on Aug. 1, 2016.

(51) Int. Cl.
*H04W 72/04* (2009.01)
*H04L 5/00* (2006.01)
(Continued)

(52) U.S. Cl.
CPC ......... *H04W 72/042* (2013.01); *H04L 5/0007* (2013.01); *H04L 5/0044* (2013.01);
(Continued)

(58) Field of Classification Search
None
See application file for complete search history.

(56) References Cited

U.S. PATENT DOCUMENTS 9,326,272 B2 4/2016 Nishio et al.
9,967,888 B1 * 5/2018 Zappaterra ............ H04L 5/0094
(Continued)

FOREIGN PATENT DOCUMENTS

CN 102057613 A 5/2011
CN 102598795 A 7/2012
(Continued)

OTHER PUBLICATIONS

Zhang, X. et al., *Macro-assisted Data-only Carrier for 5G Green Cellular Systems*, IEEE Communications Magazine 53(5) 223-231 (May 2015).
(Continued)

*Primary Examiner* — Jutai Kao
(74) *Attorney, Agent, or Firm* — Alston & Bird LLP

(57) ABSTRACT

A method, apparatus, and computer program product modifying the usage of control resources for data transmission by focusing on reducing overhead of the control channel in order to maximize the spectral efficiency by configuring physical resources into two parts for an allocation into control information for the first part, and data for both the first part and the second part or data for only the second part. Data allocation in the first part based is derived based on the data allocation in the second part and the control information allocation in the first part. The number of control symbols within a subframe or transmission time interval is minimized on the downlink control signaling, used mainly for downlink and uplink grant signaling, and for the uplink HARQ ACK/ NACK feedback. Where overhead is not the only problem,
(Continued)

usage of two symbols is proposed due to the limitations of radio frequency beamforming.

23 Claims, 7 Drawing Sheets

(51) Int. Cl.
*H04W 24/08* (2009.01)
*H04W 28/06* (2009.01)

(52) U.S. Cl.
CPC .......... *H04L 5/0053* (2013.01); *H04L 5/0064* (2013.01); *H04L 5/0092* (2013.01); *H04W 24/08* (2013.01); *H04W 28/06* (2013.01); *H04W 72/0453* (2013.01)

(56) References Cited

U.S. PATENT DOCUMENTS

| | | | |
|---|---|---|---|
| 2009/0310477 | A1 | 12/2009 | Lee et al. |
| 2011/0103292 | A1* | 5/2011 | Pasad .................... H04L 5/0053 370/315 |
| 2011/0255486 | A1 | 10/2011 | Luo et al. |
| 2013/0039284 | A1 | 2/2013 | Marinier et al. |
| 2013/0083753 | A1* | 4/2013 | Lee .................... H04W 72/0453 370/329 |
| 2013/0176841 | A1 | 7/2013 | Cao et al. |
| 2013/0242720 | A1 | 9/2013 | Chou |
| 2014/0098761 | A1* | 4/2014 | Lee ..................... H04B 17/318 370/329 |
| 2015/0003409 | A1 | 1/2015 | Hoymann |
| 2015/0043355 | A1 | 2/2015 | Kim et al. |
| 2015/0382337 | A1 | 12/2015 | Ko et al. |
| 2016/0192388 | A1 | 6/2016 | Ekpenyong et al. |
| 2019/0029007 | A1 | 1/2019 | Nishio et al. |
| 2019/0045492 | A1* | 2/2019 | Urabayashi ....... H04W 72/0446 |
| 2019/0081688 | A1* | 3/2019 | Deenoo ................. H04B 7/088 |
| 2019/0140792 | A1* | 5/2019 | Feh ...................... H04L 5/0046 |

FOREIGN PATENT DOCUMENTS

| | | |
|---|---|---|
| CN | 103081561 A | 5/2013 |
| CN | 104205682 A | 12/2014 |
| EP | 1720310 A2 | 11/2006 |
| EP | 2522112 A1 | 11/2012 |
| EP | 2804433 A4 | 6/2015 |
| RU | 2580792 C2 | 4/2016 |
| RU | 2589892 C2 | 7/2016 |
| WO | WO 2008/041110 A2 | 4/2008 |
| WO | WO 2009/087808 A1 | 7/2009 |
| WO | WO 2011/082814 A1 | 7/2011 |
| WO | WO 2013/022261 A2 | 2/2013 |
| WO | WO 2018/007538 A1 | 1/2018 |

OTHER PUBLICATIONS

International Search Report and Written Opinion for Application No. PCT/IB2017/054707 dated Oct. 20, 2017, 14 pages.
Office Action for Chinese Application No. 201780048617.2 dated Dec. 18, 2020, 7 pages.
ETRI "Overview on Frame Structure and Downlink Design for TTI Shortening" 3GPP TSG RAN WG1 Meeting #84 R1-161011. Malta, Feb. 15-19, 2016.
Huawei, HiSilicon "Short TTI for DL Transmissions" 3GPP TSG RAN WG1 Meeting #84 R1-160292. St Julian's, Malta, Feb. 15-19, 2016.
"Way Forward on sPDCCH" 3GPP TSG RAN WG1 Meeting #84bis, Busan, Korea. R1-163545. Apr. 15, 2016. https://www.3gpp.org/ftp/TSG_RAN/WG1_RL1/TSGR1_84b/Docs/.
Pedersen, Klaus et al., "A Flexible 5G Frame Structure Design for Frequency-Division Duplex Cases", IEEE Communications Magazine, vol. 54, No. 3 Mar. 1, 2016, 7 pgs.
3GPP TSG-RAN WG1 #85, Nanjing, P.R. China, May 23-27, 2016, R1-165364, "Support for Beam Based Common Control Plane", Nokia, Alcatel-Lucent Shanghai Bell, 5 pgs.
Office Action for ARIPO Application No. AP/P/2019/011302 dated Aug. 20, 2021, 4 pages.
Office Action for European Application No. 17755257.7 dated Oct. 25, 2021, 7 pages.
Notice of Allowance for Chinese Application No. 201780048617.2 dated Jun. 15, 2021, 6 pages.
Examination Report for Australian Application No. 2017306778 dated Feb. 9, 2021, 4 pages.
Examination Report for Australian Application No. 2017306778 dated Jun. 8, 2021, 3 pages.
Office Action for Canadian Application No. 3,032,245 dated Dec. 31, 2019, 4 pages.
Office Action for Canadian Application No. 3,032,245 dated Dec. 7, 2020, 3 pages.
Office Action for Canadian Application No. 3,032,245 dated Oct. 5, 2021, 4 pages.
Office Action for European Application No. 17755257.7 dated May 7, 2020, 3 pages.
Office Action for Japanese Application No. 2019-505530 dated Jan. 20, 2020, 18 pages.
InterDigital, "Consideration on sPDCCH Design", 3GPP TSG RAN WG1 Meeting #85, R1-165049, (May 23-27, 2016), 4 pages.
Decision to Grant for Japanese Application No. 2019-505530 dated Sep. 3, 2020, 5 pages.
Office Action for Japanese Application No. 2020-173139 dated Nov. 15, 2021.
Office Action for Korean Application No. 10-2019-7006137 dated Mar. 17, 2021.
Decision to Grant for Korean Application No. 10-2019-7006137 dated Oct. 25, 2021.
Office Action for Indonesian Application No. PID201900665 dated Oct. 21, 2021, 6 pages.
Office Action for Indian Application No. 201947007573 dated Dec. 1, 2020, 7 pages.
Office Action for Russian Application No. 2019104328/07 (008185) dated Jul. 4, 2019, 8 pages.
Decision to Grant for Russian Application No. 20191043328/07 dated Apr. 28, 2020, 12 pages.
Written Opinion and Search Report for Singapore Application No. 11201900610V dated Apr. 23, 2020, 8 pages.
Notice of Allowance for Singapore Application No. 11201900610V dated Oct. 1, 2021, 4 pages.
Office Action for Vietnam Application No. 1-2019-00792 dated Apr. 9, 2019, 2 pages.

* cited by examiner

ON THE USAGE OF CONTROL RESOURCES FOR DATA TRANSMISSION

CROSS REFERENCE TO RELATED APPLICATION(S)

This patent application is a U.S. National Stage application of International Patent Application Number PCT/IB2017/054707, filed Aug. 1, 2017, which claims priority to U.S. provisional application No. 62/369,241, filed Aug. 1, 2016, which are hereby incorporated by reference in their entireties.

TECHNICAL FIELD

This invention relates generally to wireless communication systems related to pre-5G standardization and as well as part of 5G standardization in 3GPP and, more specifically, to reduction of control channel overhead.

BACKGROUND

This section is intended to provide a background or context to the invention disclosed below. The description herein may include concepts that could be pursued, but are not necessarily ones that have been previously conceived, implemented or described. Therefore, unless otherwise explicitly indicated herein, what is described in this section is not prior art to the description in this application and is not admitted to be prior art by inclusion in this section.

The principle on 'in resource' control (CTRL) signaling has been discussed in literature. The main idea is to use embedded "on-the-fly" information to the users on its allocated time-frequency resources, as well as the additional information which is needed to decode the data. The physical layer (PHY) in-resource control channel (CCH) is mapped at the start of the resource allocation for the user in the first time symbol(s) and over a limited part of the frequency resources.

Another known concept is presented in LTE Rel-8, where PCFICH indicates the number of OFDMA symbols available for PDCCH/PHICH. PCFICH contains four different values: 1, 2, 3, (and 4, which is available only for the narrowband case). PDSCH starts from the next symbol indicated by PCFICH. For example, if two symbols are allocated for PDCCH (and indicated by PCFICH), PDSCH will start from the third OFDMA symbol. UE derives this info from PCFICH included in each subframe.

The current invention moves beyond these techniques.

Abbreviations that may be found in the specification and/or the drawing figures are either defined in the text or defined below after the detailed description section.

BRIEF SUMMARY

This section is intended to include examples and is not intended to be limiting. As discussed in detail below, the current invention maximizes the spectral efficiency of the system, by maximizing the number of data symbols within a subframe or transmission time interval (TTI).

Since the UL control plane may be one of the bottlenecks of hybrid beamforming architecture, this invention also includes multiple xPDCCH symbols with relatively low load to also maximize the resource usage efficiency at least in scenarios discussed herein.

An example of an embodiment of the current invention is a method that comprises configuring physical resources in a wireless communication system into two parts for an allocation into one or more allocation units of (1) control information, depending on an aggregation level, for the first part, and (2) data for both the first part and the second part or only for the second part; receiving a signal comprising downlink control information and data; and, based on the received downlink control information, deriving the data allocation in the first part based on the data allocation in the second part and the control information allocation in the first part.

An example of another embodiment of the present invention is an apparatus that comprises at least one processor and at least one memory including computer program code, where the at least one memory and the computer program code are configured, with the at least one processor, to cause the apparatus to perform at least the following: configuring physical resources in a wireless communication system into two parts for an allocation into one or more allocation units of (1) control information, depending on an aggregation level, for the first part, and (2) data for both the first part and the second part or only for the second part; receiving a signal comprising downlink control information and data; and, based on the received downlink control information, deriving the data allocation in the first part based on the data allocation in the second part and the control information allocation in the first part.

An example of an additional embodiment of the instant invention is a computer program product embodied on a non-transitory computer-readable medium in which a computer program is stored that, when being executed by a computer, is configured to provide instructions to control or carry out at least the following: configuring physical resources in a wireless communication system into two parts for an allocation into one or more allocation units of (1) control information, depending on an aggregation level, for the first part, and (2) data for both the first part and the second part or only for the second part; receiving a signal comprising downlink control information and data; and based on the received downlink control information, deriving the data allocation in the first part based on the data allocation in the second part and the control information allocation in the first part.

An example of yet another embodiment of the invention disclosed herein is an apparatus, comprising means for configuring physical resources in a wireless communication system into two parts for an allocation into one or more allocation units of (1) control information, depending on an aggregation level, for the first part, and (2) data for both the first part and the second part or only for the second part; means for receiving a signal comprising downlink control information and data; and means for deriving, based on the received downlink control information, the data allocation in the first part based on the data allocation in the second part and the control information allocation in the first part.

DETAILED DESCRIPTION OF THE DRAWINGS

In order to more effectively deal with the challenges inherent in future wireless communications system and overcome some of the disadvantages of the current state of affairs, exemplary embodiments of the current invention modify the usage of control resources for data transmission by focusing on reducing overhead of the control channel.

Assuming, for example, that one subframe includes 14 symbols, defining either 2 or 3 symbol downlink control block would mean 14% or 21% overhead from only downlink control symbols for the system (min is 7% assuming one control symbol in each 14 symbol subframe).

Thus, in order to maximize the spectral efficiency of the system, the target is to maximize data symbols or enable maximizing number of data symbols within a subframe or TTI rather than saying minimizing control symbols. Considering the downlink control signaling that is used mainly for downlink and uplink grant signaling, and for uplink HARQ ACK/NACK feedback, the number of symbols required should be minimized.

However, it should be noted that in certain scenarios, overhead is not the only problem. Usage of two symbols may be needed also due to the limitations of RF beamforming. Capabilities of hybrid beamforming architecture are limited by eNB implementation.

A narrow RF beam can serve just one direction at a time. Hence, each UE requires typically dedicated beam resources; such that xPDCCH multiplexing capacity/symbol is limited by the number of Transmitter RF beams. In order to provide sufficient performance for xPDCCH at least two (X-pol) Transmitter RF beams are allocated by embodiments of this invention towards one UE transmitting xPDCCH. In practice the number of UEs/symbol may equal to the number of Transmitter RF beams/2. The number of Receiver RF beams available at eNB depends on the implementation On the other hand the number of UEs Receiving xPDCCH varies depending on the eNB scheduler decisions (covering both UL/DL)

To summarize, UL control plane may be one of the bottlenecks of hybrid beamforming architecture. For this reason, multiple xPDCCH symbols with relatively low load may be needed, at least in some scenarios. It would make sense to maximize the resource usage efficiency also in these scenarios.

Figure 1:
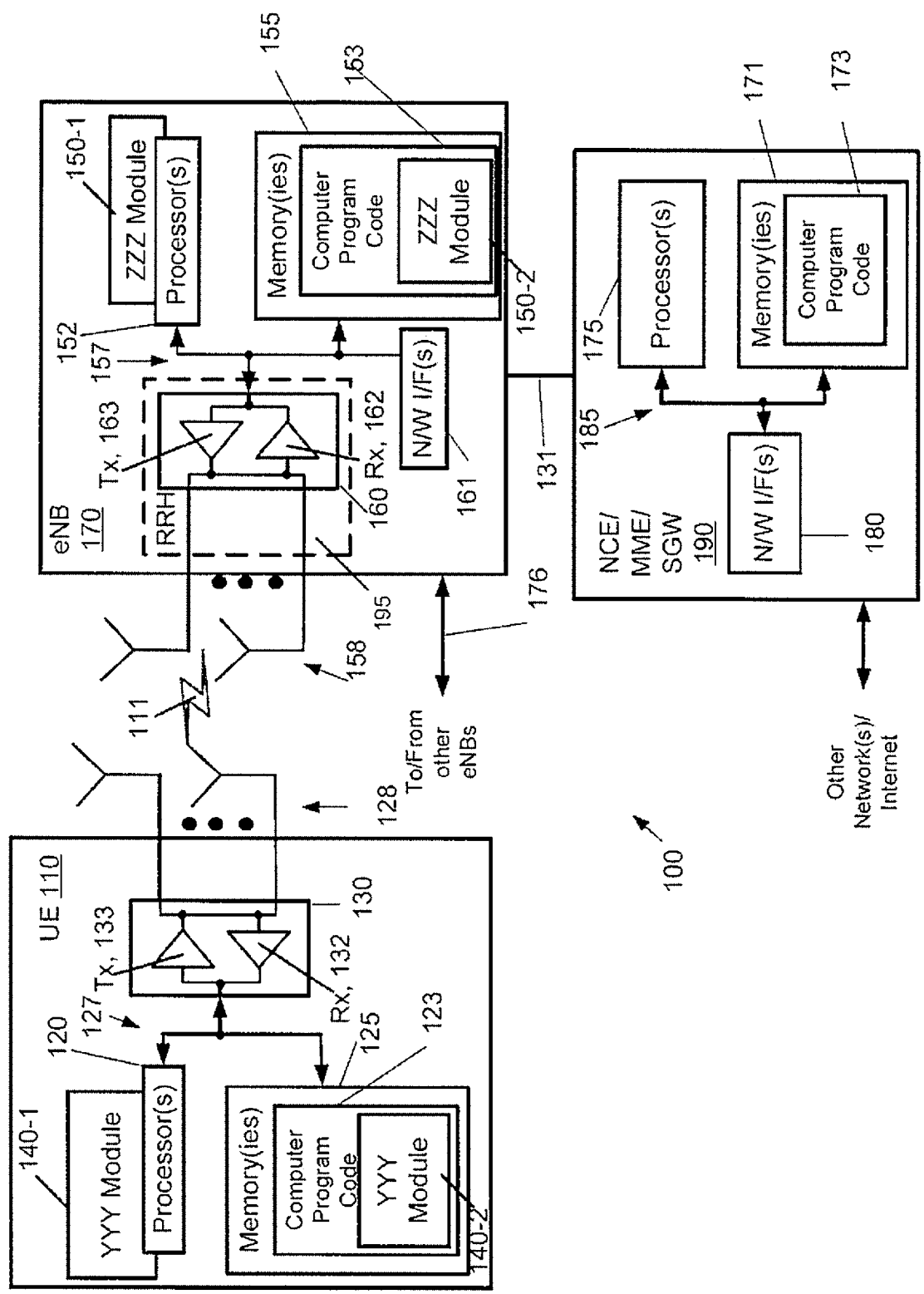
FIG. 1 is a block diagram of one possible and non-limiting exemplary system in which the exemplary embodiments may be practiced.

Before turning to a further discussion of the current invention, we turn to FIG. 1, which is a block diagram of one possible and non-limiting exemplary system in which the exemplary embodiments may be practiced.

Please note that the word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims In FIG. 1, a user equipment (UE) 110 is in wireless communication with a wireless network 100. A UE is a wireless, typically mobile device that can access a wireless network. The UE 110 includes one or more processors 120, one or more memories 125, and one or more transceivers 130 interconnected through one or more buses 127. Each of the one or more transceivers 130 includes a receiver, Rx, 132 and a transmitter, Tx, 133. The one or more buses 127 may be address, data, or control buses, and may include any interconnection mechanism, such as a series of lines on a motherboard or integrated circuit, fiber optics or other optical communication equipment, and the like. The one or more transceivers 130 are connected to one or more antennas 128. The one or more memories 125 include computer program code 123. Note that the YYY module allows functionality for the usage of control resources for data transmission where any method or examples of such embodiments discussed herein can be practiced. The UE 110 includes a YYY module 140, comprising one of or both parts 140-1 and/or 140-2, which may be implemented in a number of ways. The YYY module 140 may be implemented in hardware as YYY module 140-1, such as being implemented as part of the one or more processors 120. The YYY module 140-1 may be implemented also as an integrated circuit or through other hardware such as a programmable gate array. In another example, the YYY module 140 may be implemented as YYY module 140-2, which is implemented as computer program code 123 and is executed by the one or more processors 120. For instance, the one or more memories 125 and the computer program code 123 may be configured to, with the one or more processors 120, cause the user equipment 110 to perform one or more of the operations as described herein. The UE 110 communicates with eNB 170 via a wireless link 111.

The eNB (evolved NodeB) 170 is a base station (e.g., for LTE, long term evolution, or 5G base station) that provides access by wireless devices such as the UE 110 to the wireless network 100. The eNB 170 includes one or more processors 152, one or more memories 155, one or more network interfaces (N/W I/F(s)) 161, and one or more transceivers 160 interconnected through one or more buses 157. Each of the one or more transceivers 160 includes a receiver, Rx, 162 and a transmitter, Tx, 163. The one or more transceivers 160 are connected to one or more antennas 158. The one or more memories 155 include computer program code 153. Note that the ZZZ module allows functionality for the usage of control resources for data transmission where any method or examples of such embodiments discussed herein can be practiced. The eNB 170 includes a ZZZ module 150, comprising one of or both parts 150-1 and/or 150-2, which may be implemented in a number of ways. The ZZZ module 150 may be implemented in hardware as ZZZ module 150-1, such as being implemented as part of the one or more processors 152. The ZZZ module 150-1 may be implemented also as an integrated circuit or through other hardware such as a programmable gate array. In another example, the ZZZ module 150 may be implemented as ZZZ module 150-2, which is implemented as computer program code 153 and is executed by the one or more processors 152. For instance, the one or more memories 155 and the computer program code 153 are configured to, with the one or more processors 152, cause the eNB 170 to perform one or more of the operations as described herein. The one or more network interfaces 161 communicate over a network such as via the links 176 and 131. Two or more eNBs 170 communicate using, e.g., link 176. The link 176 may be wired or wireless or both and may implement, e.g., an X2 interface.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) 195, with the other elements of the eNB 170 being physically in a different location from the RRH, and the one or more buses 157 could be implemented in part as fiber optic cable to connect the other elements of the eNB 170 to the RRH 195.

It is noted that description herein indicates that "cells" perform functions, but it should be clear that the eNB that forms the cell would perform the functions. The cell makes up part of an eNB. That is, there can be multiple cells per eNB. For instance, there could be three cells for a single eNB carrier frequency and associated bandwidth, each cell covering one-third of a 360-degree area so that the single eNB's coverage area covers an approximate oval or circle. Furthermore, each cell can correspond to a single carrier and an eNB may use multiple carriers. So if there are three 120-degree cells per carrier and two carriers, then the eNB has a total of 6 cells.

The wireless network 100 may include a network control element (NCE) 190 that may include MME (Mobility Management Entity)/SGW (Serving Gateway) functionality, and which provides connectivity with a further network, such as a telephone network and/or a data communications network (e.g., the Internet). The eNB 170 is coupled via a link 131 to the NCE 190. The link 131 may be implemented as, e.g., an S1 interface. The NCE 190 includes one or more processors 175, one or more memories 171, and one or more network interfaces (N/W I/F(s)) 180, interconnected through one or more buses 185. The one or more memories 171 include computer program code 173. The one or more memories 171 and the computer program code 173 are configured to, with the one or more processors 175, cause the NCE 190 to perform one or more operations.

The wireless network 100 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization may still be implemented, at some level, using hardware such as processors 152 or 175 and memories 155 and 171, and also such virtualized entities create technical effects.

The computer readable memories 125, 155, and 171 may be of any type suitable to the local technical environment and may be implemented using any suitable data storage technology, such as semiconductor based memory devices, flash memory, magnetic memory devices and systems, optical memory devices and systems, fixed memory and removable memory. The computer readable memories 125, 155, and 171 may be means for performing storage functions. The processors 120, 152, and 175 may be of any type suitable to the local technical environment, and may include one or more of general purpose computers, special purpose computers, microprocessors, digital signal processors (DSPs) and processors based on a multi-core processor architecture, as non-limiting examples. The processors 120, 152, and 175 may be means for performing functions, such as controlling the UE 110, eNB 170, and other functions as described herein.

In general, the various embodiments of the user equipment 110 can include, but are not limited to, cellular phones such as smart devices, tablets, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, internet appliances permitting wireless Internet access and browsing, tablets with wireless communication capabilities, as well as portable units or terminals that incorporate combinations of such functions. In addition, various embodiments of the user equipment include machines, communicators and categories of equipment, which are not primarily or not at all in use by human interaction.

In this invention, we show a new scheme to reduce DL control channel overhead of pre-5G standard.

Figure 2:
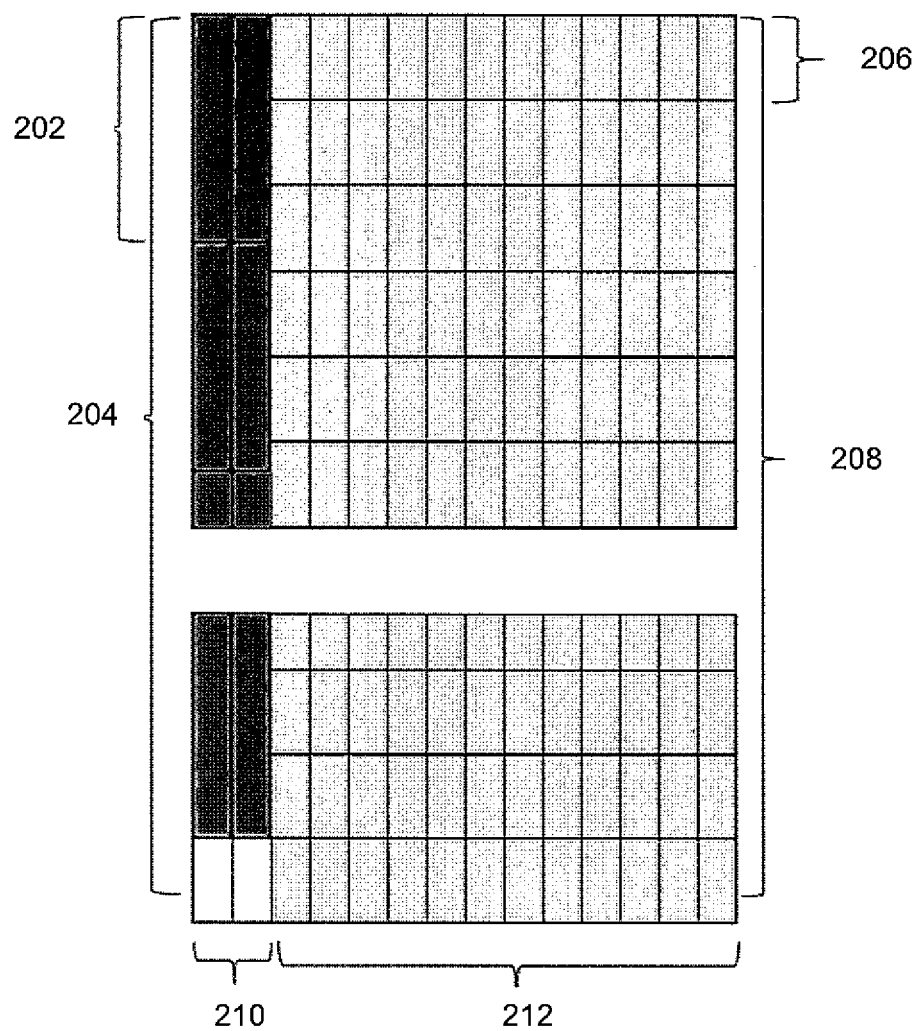
FIG. 2 represents the time/frequency structure of DL subframe according to 5G pre-standard.

As seen in FIG. 2, which is a time/frequency structure of DL subframe according to 5G pre-standard, the subframe contains one or two xPDCCH symbols: 7/14% overhead (i.e. one or two out of 14 symbols). Frequency Division Multiplexing (FDM) between parallel xPDCCH channels is within each xPDCCH symbol. A minimum allocation unit for xPDCCH equals to 128 sub-carriers; 96 data sub-carriers (192 bits assuming QPSK modulation); 32 pilot subcarriers (16 per FDM layer).

In particular, item 202 represents the minimum control allocation unit 128 subcarriers. Item 204 represents 9×128 subcarriers. Item 206 represents the minimum data allocation unit 48 subcarriers. Item 208 represents 100 MHz carrier 25×48 subcarriers. Item 210 represents downlink control of 1-2 OFDMA symbols. Item 212 represents downlink data of 13-13 OFDMA symbols.

A single user can have 1, 2, 4, or 8 allocation unit(s).

A UE searches downlink control information (DCI) from both two symbols that can be mapped to xPDCCH. The search space is common for each symbol independently, which means that the UE shall monitor all the candidates for two symbols if not restricted by separate configuration or pre-determined rules.

Figure 3:
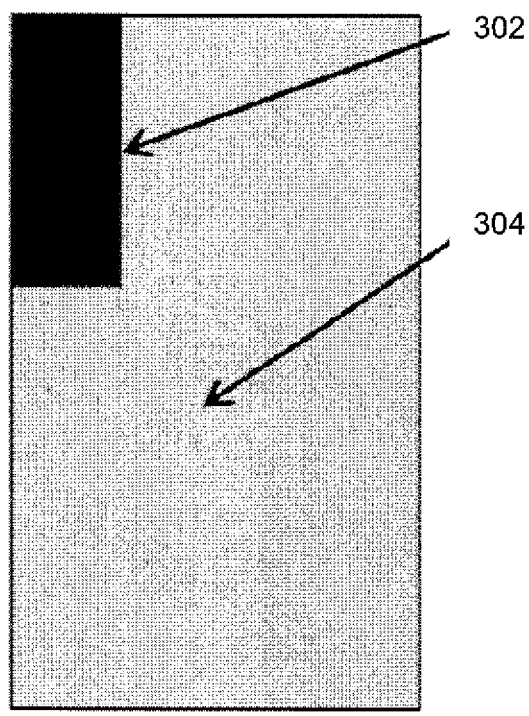
FIG. 3 illustrates the principle of in-resource CTRL signaling.

As discussed earlier regarding 'in resource' CTRL signaling, the physical layer (PHY) in-resource control channel (CCH) is mapped at the start of the resource allocation for the user in the first time symbol(s) and over a limited part of the frequency resources, as shown in FIG. 3, which illustrates the principle of in-resource CTRL signaling.

In particular, item 302 represents the in-resource control channel (CCH) with downlink scheduling grant, while item 304 represents the downlink data payload. Note the CCH content summary: UE identifier; PHY configuration for data payload; HARQ information; and MIMO information.

However, there are problems with this approach including that the UL grants require a specific solution and a UE blind detection burden may be an issue.

Regarding the other concept of LTE Rel-8 discussed above, problems with the LTE approach include that each symbol is allocated either for data or control. Hence, the LTE Rel-8 approach does not support multiplexing of control and data within a symbol.

Figure 4:
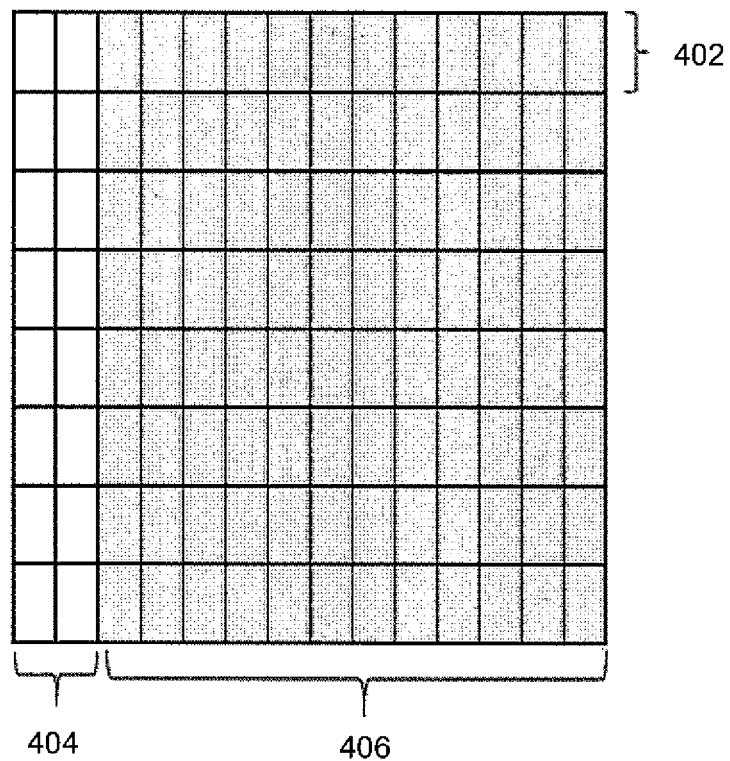
FIG. 4 represents an example of time domain resource division between (A) resources available for CTRL and data, and (B) and resources used for data.
Figure 5:
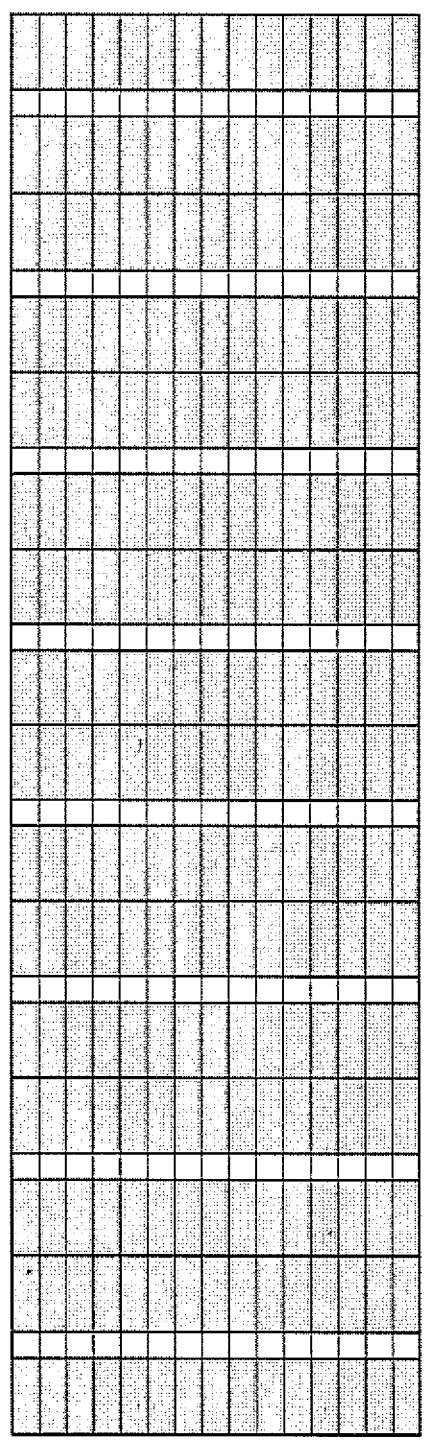
FIG. 5 represents an example of frequency domain resource division between (A) resources available for CTRL and data, and (B) resources used for data.

In contrast to these methodologies, the current invention has the BS/system configuring the physical resources in at least two parts as shown in FIG. 4 and FIG. 5, namely, (A) the resources available for control and data transmission and (B) the resources available for data transmission only. Such a configuration may be semi-static and be provided via higher layer control signaling (such as system information, or RRC signaling).

In FIG. 4, item 402 represents a minimum frequency allocation unit. Items 404 and 406 represent the resources available for parts A and B respectively, namely, item 404 represents the resources available for control and data and item 406 represents the resources available for data. In FIG. 5, the key therein defines those the unshaded blocks 502 as representing resources available for control and data and the shaded blocks 504 as representing resources available for data.

Parts A and B consist of multiple allocation units. An allocation unit consists of a predetermined amount of OFDMA symbols in time and subcarriers in frequency. An allocation unit may have different size in parts A and B).

The current invention has the BS allocating: DCIs into one or more allocation units for part A depending on the aggregation level; and data into one or more allocation units for both parts A and B or only for part B.

The UE monitors the DCI candidates for the part A.

The DCI may contain information about data allocation in both parts A and B. Information of data allocation for part A may be inverse, such that it contains, for instance, a bitmap about allocation units used for CTRL (other signaling solutions can be used as well, for example, those which allow indicating one or multiple clusters of contiguous allocation units).

Then the UE derives the frequency domain allocation of data in part A based on the frequency allocation in part B and knowledge about allocation units used for CTRL in part A. The data transport block may be rate-matched around reserved CTRL control blocks in part A.

One exemplary embodiment of the invention has a separate DCI format to support the data transmission in part A. Utilizing separate DCIs keeps the DCI format size small, as in the case when there is no need to use part A for data transmission.

A further embodiment of the above exemplary embodiment has separate DCI formats to support data transmission is part A to limit usage of the DCI format for the subset of aggregation levels when the size of part A is small. For instance, a DCI format to support data transmission in part A where the size of part A is smaller than certain predetermined size would be possible for n lowest aggregation levels from all aggregation levels m, where n<m (n e.g. 1 or 2). Since high aggregation levels consume resource elements from part A, usage of part A for data REs (resource elements) with high aggregation levels may not provide improvement when part A has a limited number of REs. Correspondingly, in those cases, the blind decoding effort for the UE can be reduced.

In yet another example of an embodiment of the current invention, a beam switching gap is included between the 1st and the 2nd (or in general between consecutive) OFDMA symbols carrying DCI.

Another exemplary embodiment of the invention, as seen in FIG. 5, allows flexible multiplexing between traffic having different QoS requirements. In this case, traffic having a higher QoS is transmitted similar to CTRL information. For example: multiplexing between UL CTRL and data with non-scheduled access; and multiplexing between URLCC and MBB in UL direction. In this case service having tighter latency requirement (e.g. URLCC (Ultra Reliable Low latency Communication)) is transmitted in region A and MBB (Mobile BroadBand) in region B and also in region A when URLCC is not exist. The UE monitors the URLCC candidates for the part A.

Figure 6:
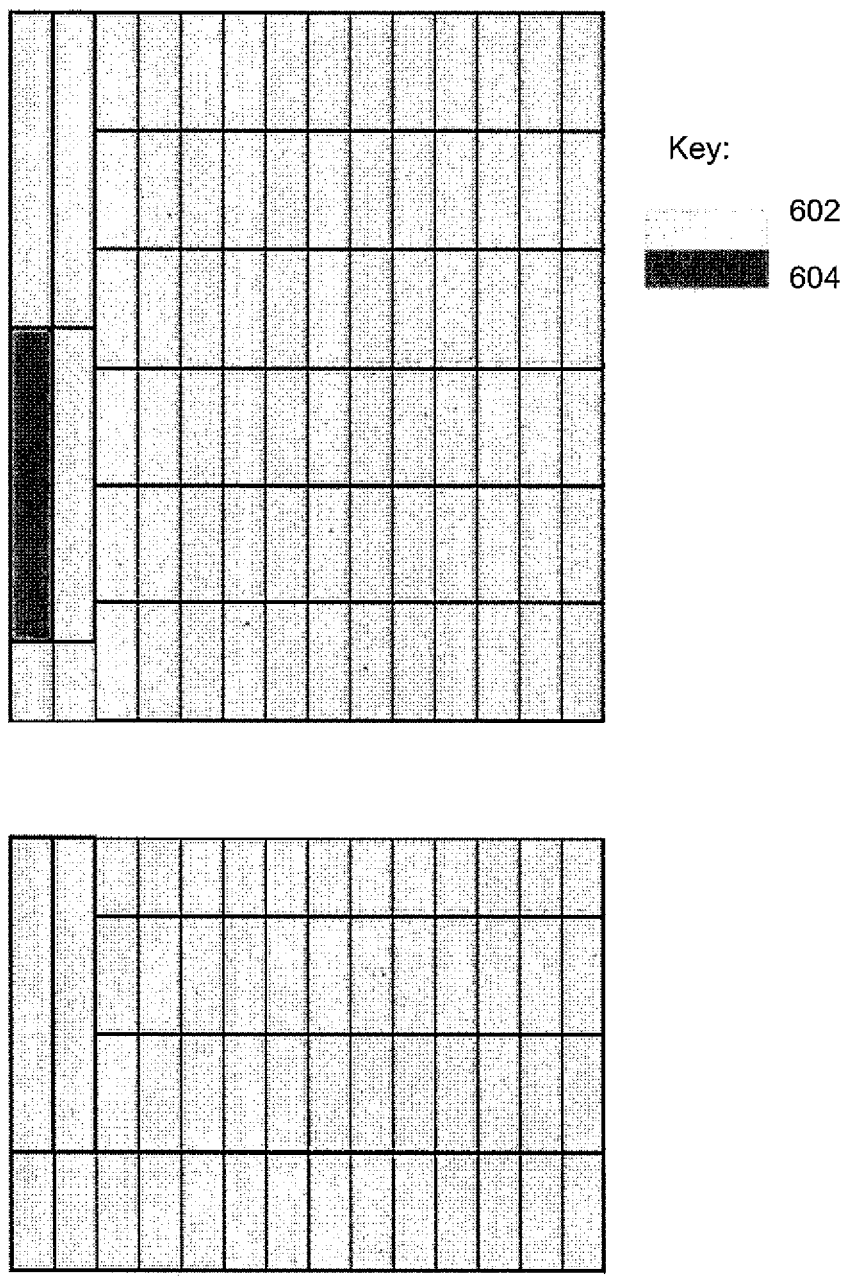
FIG. 6 represents an example of implementing an embodiment of the invention on the top of the pre-5G standard.

FIG. 6 shows an exemplary implementation of the invention on the top of pre-5G standard. As can be seen from the key in FIG. 6, lightly shaded blocks 602 represent data allocation while the darkly shaded block 604 represents control allocation. In the example of figure, only one allocation unit is allocated to CTRL respect to overhead of 0.76% (100*128/(14*1200). Overhead reduction can translated to 6 or 13% throughput gain depending on the number of OFDMA symbols allocated to xPDCCH. The only change needed is to the signaling of allocation units used for CTRL. The signaling can realized by adding bitmap of 18 bits in the DCI or introducing additional DCI format to support data transmission in CTRL region. The bitmap required can be also compressed down to X bits e.g. down to 9 bits in such that each bit indicates two consecutive CTRL regions. Information about the potential RF beam switching gap may also be included in the DCI.

Embodiments herein may be implemented in software (executed by one or more processors), hardware (e.g., an application specific integrated circuit), or a combination of software and hardware. In an example of an embodiment, the software (e.g., application logic, an instruction set) is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted, e.g., in FIG. 1. A computer-readable medium may comprise a computer-readable storage medium (e.g., 104, 134, or other device) that may be any media or means that can contain, store, and/or transport the instructions for use by or in connection with an instruction execution system, apparatus, or device, such as a computer. A computer-readable storage medium does not comprise merely propagating signals.

Figure 7:
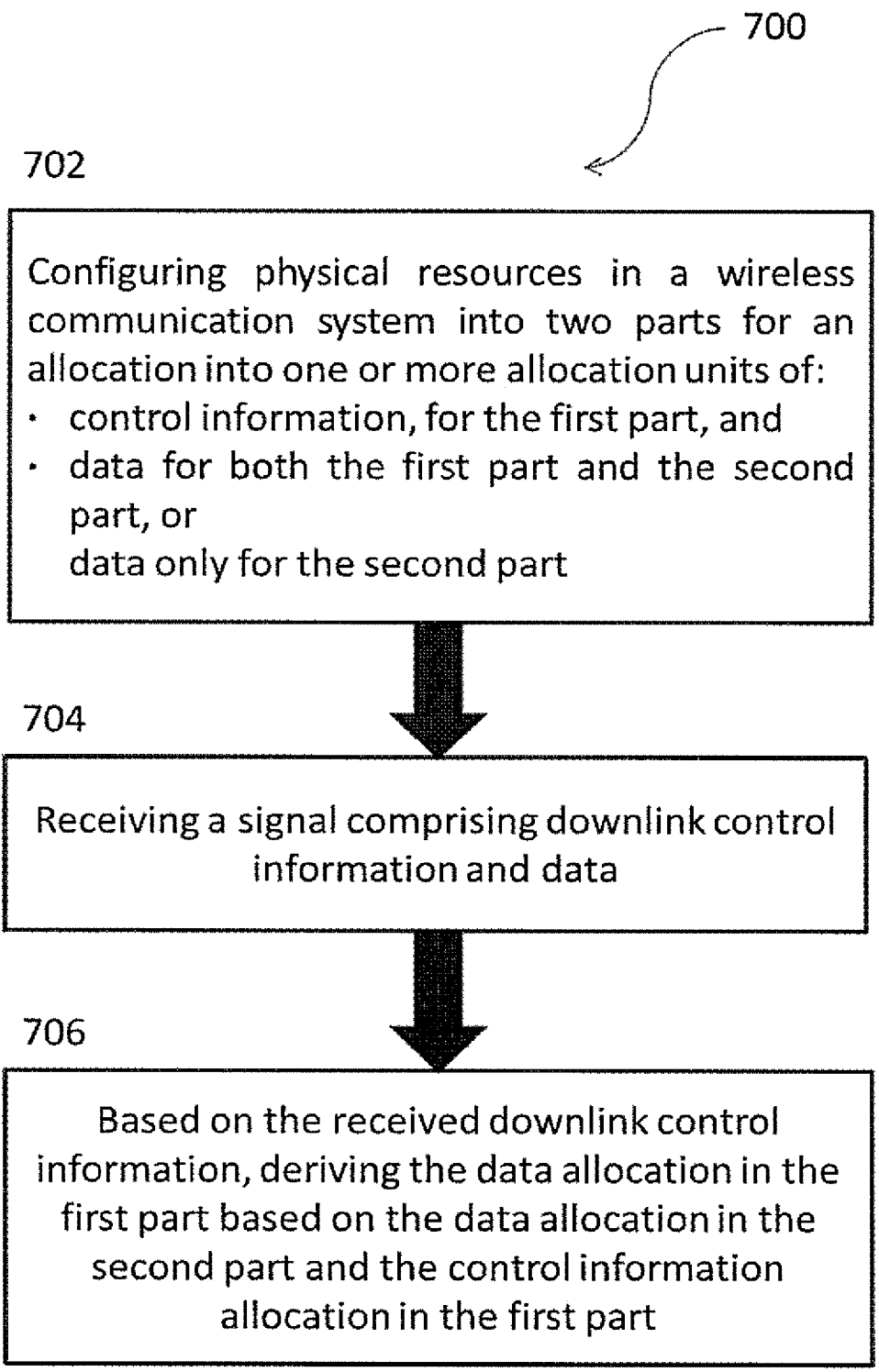
FIG. 7 is a logic flow diagram for dynamic segmentation, and illustrates the operation of an exemplary method, a result of execution of computer program instructions embodied on a computer readable memory, functions performed by logic implemented in hardware, and/or interconnected means for performing functions in accordance with exemplary embodiments.

FIG. 7 is a logic flow diagram for dynamic segmentation, and illustrates the operation of an exemplary method 700, a result of execution of computer program instructions embodied on a computer readable memory, functions performed by logic implemented in hardware, and/or interconnected means for performing functions in accordance with exemplary embodiments. Parts or all of method 700 could be performed in module YYY or module ZZZ as appropriate.

Step 702 depicts configuring physical resources in a wireless communication system into two parts for an allocation into one or more allocation units of • control information, depending on an aggregation level, for the first part, and • data for both the first part and the second part or only for the second part. Step 704 depicts receiving a signal comprising downlink control information and data. Step 704 depict, based on the received downlink control information, deriving the data allocation in the first part based on the data allocation in the second part and the control information allocation in the first part.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

Without in any way limiting the scope, interpretation, or application of the claims appearing below, an advantage or a technical effect of one or more of the example embodiments disclosed herein is up to 13% throughput gain without any blind decoding impacts. Another technical effect or advantage of one or more of the example embodiments disclosed herein is that application of the concepts has no impact to UE blind decoding burden. A still further advantage or technical effect of embodiments of the present invention is that it allows multiplexing control and data within the same symbol while maintaining the opportunity to ascertain part of control and data.

An example of an embodiment of the current invention, which can be referred to as item 1, is a method that comprises configuring physical resources in a wireless communication system into two parts for an allocation into one or more allocation units of (1) control information, depending on an aggregation level, for the first part, and (2) data for both the first part and the second part or only for the second part; receiving a signal comprising downlink control information and data; and, based on the received downlink control information, deriving the data allocation in the first part based on the data allocation in the second part and the control information allocation in the first part.

An example of a further embodiment of the current invention, which can be referred to as item 2, is the method of item 1, where the first part and the second part comprise a plurality of allocation units.

An example of a further embodiment of the current invention, which can be referred to as item 3, is the method of any preceding item, where an allocation unit comprises a predetermined amount of OFDMA symbols in time and subcarriers in frequency.

An example of a further embodiment of the current invention, which can be referred to as item 4, is the method of any preceding item, where an allocation unit may have a different size in the first part and the second part.

An example of a further embodiment of the current invention, which can be referred to as item 5, is the method of any preceding item, where downlink control information comprises information about data allocation for the first part and/or the second part.

An example of a further embodiment of the current invention, which can be referred to as item 6, is the method of any preceding item, where the configuring is semi-static and is provided via higher layer control signaling.

An example of a further embodiment of the current invention, which can be referred to as item 7, is the method of any preceding item, where the allocating of data into the first part is based on an indication of allocation units not used for control information.

An example of a further embodiment of the current invention, which can be referred to as item 8, is the method of any preceding item, where a separate DCI format supports data transmission in the first part.

An example of a further embodiment of the current invention, which can be referred to as item 9, is the method of item 8, where use of the separate DCI format is based on a size of the first part being smaller than certain predetermined size for n lowest aggregation levels from all aggregation levels in, where n<m.

An example of a further embodiment of the current invention, which can be referred to as item 10, is the method of any preceding item, where a beam switching gap is included between consecutive OFDMA symbols carrying downlink control information.

An example of a further embodiment of the current invention, which can be referred to as item 3, is the method of any preceding item, where data transmission with a higher latency requirement over a threshold is the configured the first part.

An example of another embodiment of the present invention, which can be referred to as item 12, is an apparatus that comprises at least one processor and at least one memory including computer program code, where the at least one memory and the computer program code are configured, with the at least one processor, to cause the apparatus to perform at least the following: configuring physical resources in a wireless communication system into two parts for an allocation into one or more allocation units of (1) control information, depending on an aggregation level, for the first part, and (2) data for both the first part and the second part or only for the second part; receiving a signal comprising downlink control information and data; and, based on the received downlink control information, deriving the data allocation in the first part based on the data allocation in the second part and the control information allocation in the first part.

An example of another embodiment of the present invention, which can be referred to as item 13, is the apparatus of item 12, where the first part and the second part comprise a plurality of allocation units.

An example of another embodiment of the present invention, which can be referred to as item 14, is the apparatus of items 12 or 13, where an allocation unit comprises a predetermined amount of OFDMA symbols in time and subcarriers in frequency.

An example of another embodiment of the present invention, which can be referred to as item 15, is the apparatus of items 12-14, where an allocation unit may have a different size in the first part and the second part.

An example of another embodiment of the present invention, which can be referred to as item 16, is the apparatus of items 12-15, where downlink control information comprises information about data allocation for the first part and/or the second part.

An example of another embodiment of the present invention, which can be referred to as item 17, is the apparatus of items 12-16, where the configuring is semi-static and is provided via higher layer control signaling.

An example of another embodiment of the present invention, which can be referred to as item 18, is the apparatus of items 12-17, where the allocating of data into the first part is based on an indication of allocation units not used for control information.

An example of another embodiment of the present invention, which can be referred to as item 19, is the apparatus of items 12-18, where a separate DCI format supports data transmission in the first part.

An example of another embodiment of the present invention, which can be referred to as item 20, is the apparatus of item 19, where use of the separate DCI format is based on a size of the first part being smaller than certain predetermined size for n lowest aggregation levels from all aggregation levels m, where n<m.

An example of another embodiment of the present invention, which can be referred to as item 21, is the apparatus of items 12-20, where a beam switching gap is included between consecutive OFDMA symbols carrying downlink control information.

An example of another embodiment of the present invention, which can be referred to as item 22, is the apparatus of items 12-21, where data transmission with a higher latency requirement over a threshold is the configured the first part.

An example of an additional embodiment of the instant invention, which can be referred to as item 23, is a computer program that comprises code for: configuring physical resources in a wireless communication system into two parts for an allocation into one or more allocation units of (1) control information, depending on an aggregation level, for the first part, and (2) data for both the first part and the second part or only for the second part; receiving a signal comprising downlink control information and data; and based on the received downlink control information, deriving the data allocation in the first part based on the data allocation in the second part and the control information allocation in the first part.

An example of an additional embodiment of the instant invention, which can be referred to as item 24, is the computer program according to item 23, wherein the computer program is embodied on a computer program product comprising a computer-readable medium bearing computer program code therein for use with a computer.

An example of yet another embodiment of the current invention, which can be referred to as item 25, is a non-transitory computer-readable medium encoded with instructions that, when executed by a computer, performs the method of any of items 1-12.

An example of a still further embodiment of the present invention, which can be referred to as item 26, is an apparatus, comprising means for: configuring physical resources in a wireless communication system into two parts for an allocation into one or more allocation units of (1) control information, depending on an aggregation level, for the first part, and (2) data for both the first part and the second part or only for the second part; receiving a signal comprising downlink control information and data; and, based on the received downlink control information, deriving the data allocation in the first part based on the data allocation in the second part and the control information allocation in the first part.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

It is also noted herein that while the above describes examples of embodiments of the invention, these descriptions should not be viewed in a limiting sense. Rather, there are several variations and modifications which may be made without departing from the scope of the present invention as defined in the appended claims.

List of abbreviations used herein:
3GPP 3rd generation partnership project
5G Fifth generation
ACK Acknowledgement
ARQ Automatic Repeat-reQuest
BS Base Station
CB Contention based
DCI Downlink Control Information
DL Downlink
NACK Negative-acknowledgement
UL Uplink
eNB Evolved Node B, base station node in LTE
HARQ Hybrid automatic repeat request
LTE Long term evolution
MTC Mission type communication
PUSCH Physical uplink shared channel
QoS Quality of Service
ReTx Retransmission or retransmitting
Rx, RX Reception or receiving
SPS Semi-persistent scheduling
TTI Transmission time interval
Tx, TX Transmission or transmitting
TXRU Transceiver Unit
UE User equipment
UL Uplink

What is claimed is:

1. A method comprising:
receiving configuration information on physical resources in a wireless communication system, wherein the physical resources are configured into a first part and a second part, the first part comprising one or more allocation units for control information and data depending on an aggregation level, and the second part comprising one or more allocation units for data;
receiving downlink control information and data transmission; and
based on the received downlink control information, deriving an allocation for the data transmission in the first part, wherein the deriving is based on an allocation for the data transmission in the second part and wherein the deriving is further based on an allocation for the control information in the first part.

2. The method of claim 1, wherein an allocation unit comprises a predetermined amount of OFDMA symbols in time and subcarriers in frequency.

3. The method of claim 1, wherein an allocation unit has a different size in the first part and the second part.

4. The method of claim 1, wherein the downlink control information comprises information about the allocation for the data transmission in the first part and/or the second part.

5. The method of claim 1, wherein the configuration information is semi-static and is provided via higher layer control signaling.

6. The method of claim 1, wherein a data allocation into the first part is based on an indication of allocation units not used for the control information.

7. The method of claim 1, wherein a separate DCI format supports the data transmission in the first part.

8. The method of claim 7, wherein use of the separate DCI format is based on a size of the first part being smaller than certain pre-determined size for one or more lowest aggregation levels from among a plurality of aggregation levels, where the plurality of aggregation levels comprises a larger number of aggregation levels than said one or more lowest aggregation levels.

9. The method of claim 1, wherein a beam switching gap is included between consecutive OFDMA symbol carrying the downlink control information.

10. The method of claim 1, wherein the data transmission with a higher latency requirement over a threshold is configured in the first part.

11. The method of claim 1, comprising multiplexing the downlink control information and the data transmission within a symbol.

12. An apparatus comprising:
  at least one processor; and
  at least one non-transitory memory including computer program code, the at least one memory and the computer program code configured to, with the at least one processor, cause the apparatus to perform at least the following:
    receiving configuration information on physical resources in a wireless communication system, wherein the physical resources are configured into a first part and a second part, the first part comprising one or more allocation units for control information and data depending on an aggregation level, and the second part comprising one or more allocation units for data;
    receiving downlink control information and data transmission; and
    based on the received downlink control information, deriving an allocation for the data transmission in the first part, wherein the deriving is based on an allocation for the data transmission in the second part and wherein the deriving is further based on an allocation for the control information in the first part.

13. The apparatus of claim 12, wherein an allocation unit comprises a predetermined amount of OFDMA symbols in time and subcarriers in frequency.

14. The apparatus of claim 12, wherein an allocation unit has a different size in the first part and the second part.

15. The apparatus of claim 12, wherein downlink control information comprises information about the allocation for the data transmission in the first part and/or the second part.

16. The apparatus of claim 12, wherein the configuring is semi-static and is provided via higher layer control signaling.

17. The apparatus of claim 12, wherein a data allocation into the first part is based on an indication of allocation units not used for the control information.

18. The apparatus of claim 12, wherein a separate DCI format supports the data transmission in the first part.

19. The apparatus of claim 18, wherein use of the separate DCI format is based on a size of the first part being smaller than certain pre-determined size for one or more lowest aggregation levels from among a plurality of aggregation levels, where the plurality of aggregation levels comprises a larger number of aggregation levels than said one or more lowest aggregation levels.

20. The apparatus of claim 12, wherein a beam switching gap is included between consecutive OFDMA symbols carrying the downlink control information.

21. The apparatus of claim 12, wherein the data transmission with a higher latency requirement over a threshold is configured in the first part.

22. The apparatus of claim 12, wherein the at least one memory and the computer program code are configured to, with the at least one processor, cause the apparatus to perform multiplexing the downlink control information and the data transmission within a symbol.

23. A non-transitory program storage device readable by a machine, tangibly embodying computer program code comprising:
  code for receiving configuration information on physical resources in a wireless communication system, wherein the physical resources are configured into a first part and a second part, the first part comprising one or more allocation units for control information and data depending on an aggregation level, and the second part comprising one or more allocation units for data;
  code for receiving downlink control information and data transmission; and
  code for, based on the received downlink control information, deriving an allocation for the data transmission in the first part, wherein the deriving is based on an allocation for the data transmission in the second part and wherein the deriving is further based on an allocation for the control information in the first part.

* * * * *